Patented Oct. 14, 1952

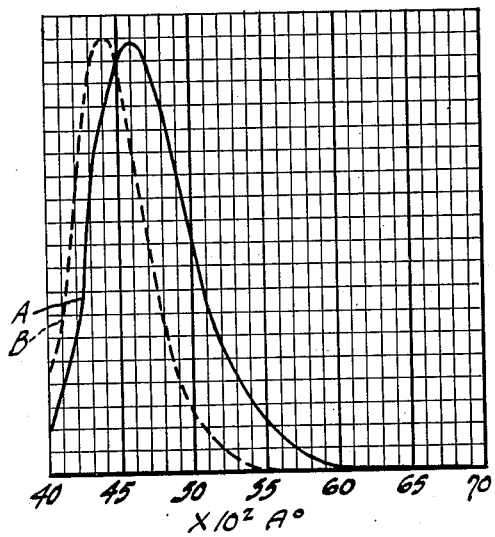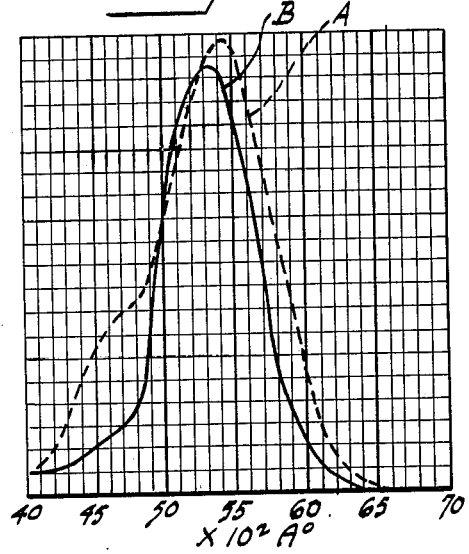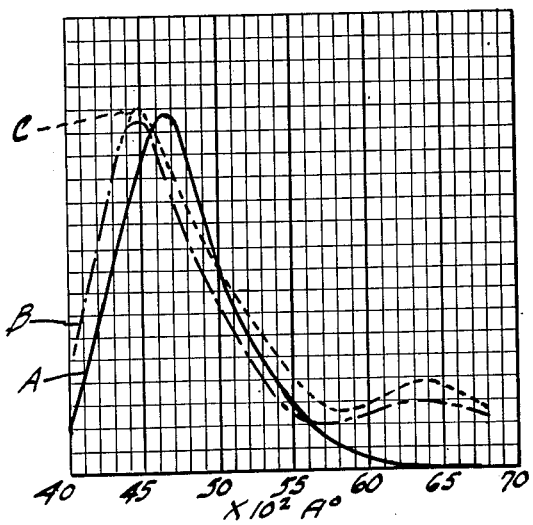

2,614,082

UNITED STATES PATENT OFFICE 2,614,082

ZINC SULFIDE TYPE PHOSPHORS CONTAINING MAGNESIUM SULFIDE

Arthur L. J. Smith, Lancaster, Pa., assignor to Radio Corporation of America, a corporation of Delaware Application November 30, 1949, Serial No. 130,176

8 Claims. (Cl. 252—301.6)

This invention relates to novel and improved phosphors of the metallic sulfide type. More particularly, the invention relates to phosphors comprising luminescent zinc sulfide, or zinc-cadmium sulfide containing magnesium sulfide in solid solution.

Because of their high emission efficiency and the fact that their peak light output may be varied from the blue to the red region of the spectrum, sulfide phosphors such as activated, luminescent zinc sulfide and zinc-cadmium sulfide have been widely used as components of phosphor compositions for television kinescope tube screens and also as luminescent paint pigments. Although these previously known sulfide phosphors have been satisfactory for most purposes and have become widely used in industry, it is sometimes desirable to lower the wavelength of peak emission of a sulfide phosphor having high efficiency. Moreover, 4150 Å. is about the lowest peak wavelength possible to attain with zinc sulfide phosphors, whereas it is possible to have wavelengths of peak emission of lower values than this in materials of the present invention.

One object of the present invention is to provide novel phosphors of the sulfide type having high visual efficiencies and relatively high peak outputs of emission but having different spectral distributions and decay characteristics than those of previously known sulfide phosphors.

Another object of the invention is to provide improved, highly efficient phosphor materials having peak emission in the deep blue region of the spectrum.

Another object of the invention is to provide improved sulfide phosphors of which the shift in peak wavelength of emission can be controlled by addition of different amounts of another material.

Another object of the invention is to provide improved sulfide phosphors which are capable of utilizing a wider variety of activators than previously known luminescent materials of the sulfide type.

The above and other objects are accomplished in accordance with the present invention by incorporating in zinc sulfide or in zinc-cadmium sulfide from about 0.5 to about 30 mol per cent magnesium sulfide. The magnesium sulfide is heated with the other sulfides such that it is in solid solution therewith, and in such manner as to cause the resultant product to be luminescent.

The invention will now be described in more detail with the aid of drawings of which:

Figure 1 is a graph including spectral distribution curves, one of which is for a silver-activated zinc sulfide phosphor and another of which is for the same phosphor with magnesium sulfide incorporated therewith;

Figure 2 is a graph including spectral distribution curves, one of which is for a copper activated zinc sulfide phosphor and another of which is for the same phosphor with magnesium sulfide;

Figure 3 is a graph including spectral distribution curves, one of which is for a zinc sulfide phosphor and others of which are for the same phosphor with magnesium sulfide added, the latter material being activated with either bismuth or lead.

The luminescent materials of the present invention may be prepared in either of two ways. One of these is to heat a mixture of the sulfides, in the presence of a flux, in a neutral atmosphere. The other general method is to start with the magnesium component in the form of a compound such as $MgNH_4Cl_3$ and heat this material, and the other components, in the form of sulfides, in an atmosphere of hydrogen sulfide. The magnesium compound, itself, acts as the flux in this case.

Some specific examples of preparation will now be given:

Example I 90 mol per cent powdered luminescence pure ZnS and 10 mol per cent anhydrous powdered luminescence pure MgS are thoroughly mixed. To this mixture are added 3% by weight of magnesium ammonium chloride as a flux and 0.01% by weight of Cu as activator. This mixture is fired for 20 minutes at 1050° C. in an atmosphere of nitrogen. The phosphor thus prepared was found to have a peak emission at 5180 Å. under cathode ray excitation.

Example II 75 mol per cent powdered luminescence pure ZnS was mixed with an amount of $MgNH_4Cl_3$ (magnesium ammonium chloride) such that the latter compound was equivalent to 25 mol per cent MgS. To this mixture was added 0.01% by weight of copper activator. The final mixture was fired in an atmosphere of hydrogen sulfide for 45 minutes at 950° C. The product was tested and found to be a solid solution of MgS in ZnS. It had a peak emission wavelength of 5150 Å. under cathode ray excitation.

Example III 90 mol per cent ZnS was mixed with 10 mol per cent MgNH₄Cl₃. To the mixture was added two activators as follows: 0.01% by weight copper and 0.1% by weight manganese. This mixture was fired for 40 minutes at 940° C. in a hydrogen sulfide atmosphere. The firing process converted part of the MgNH₄Cl₃ to MgS. This material was found to have the property of being sensitive to infra-red stimulation after excitation by ultra-violet or cathode-rays.

Example IV-A

.95 mol of a zinc-cadmium sulfide consisting of 59.6 mol per cent ZnS and 40.4 mol per cent CdS was mixed with .05 mol anhydrous MgS. To this mixture was added 0.01% by weight of copper activator and 3% by weight of NaCl flux. The mixture was fired at 1050° C. for 20 minutes in a nitrogen atmosphere. The peak emission wavelength of the product was found to be in the infra-red.

Example IV-B

The same zinc-cadmium sulfide and magnesium sulfide were mixed in the proportion of .90 mol of the former to .10 mol of the latter. The process of preparing the product was the same as in Example IV-A above. The peak emission wavelength of this material was also found to be in the infra-red.

Example IV-C

A product similar to that of Example IV-A was prepared from .8 mol zinc-cadmium sulfide and .2 mol magnesium sulfide. The material was found to have a peak wavelength of emission of about 6650 Å. Process of preparation was the same as that described above.

Example IV-D

Another product prepared similar to that of Example IV-A was made from .7 mol zinc-cadmium sulfide and .3 mol magnesium sulfide. The material was found to have a peak wavelength of emission of about 5820 Å.

Example V-A

Using the same method of preparation as in Examples IV-A to IV-D, a material was prepared using .95 mol of a zinc-cadmium sulfide consisting of 91.2 mol per cent ZnS and 8.8 mol per cent CdS, and also using .05 mol of magnesium sulfide. This material had a wavelength of peak emission of about 5820 Å.

Example V-B

Another material was prepared using .9 mol of the same zinc-cadmium sulfide as used in Example V-A and .1 mol magnesium sulfide. The wavelength of peak emission was about 5600 Å.

Example V-C

Using the same zinc-cadmium sulfide as used in Example V-A, another material was prepared using .8 mol zinc-cadmium sulfide and .2 mol magnesium sulfide. The wavelength of peak emission was about 4690 Å.

Example V-D

Still another material using the same zinc-cadmium sulfide as in Example V-A was prepared from .7 mol zinc-cadmium sulfide and .3 mol MgS. The wavelength of peak emission was about 4620 Å.

Example VI

A phosphor material was prepared from 90 mol per cent ZnS and 10 mol per cent MgS with 0.1 mol per cent bismuth activator. The bismuth was added as bismuth oxychloride. This material was prepared by heating the mixture at 1050° C. for about 20 minutes in a nitrogen atmosphere. 3% by weight of sodium chloride was used as a flux. The product was found to have a peak wavelength of emission of about 4440 Å.

Example VII

Using the same method of preparation as in Example VI, a product was prepared from 90 mol per cent ZnS and 10 mol per cent MgS. The activator, in this case, was 0.1 mol per cent antimony. The product was found to have a peak wavelength of emission of about 4600 Å.

In all of the above examples, the activator may be added to the wet zinc sulfide powder (or zinc-cadmium sulfide). The mixture is then dried thoroughly and milled with magnesium sulfide in anhydrous acetone or some other anhydrous organic solvent.

That the magnesium sulfide enters into solid solution with the zinc sulfide or zinc-cadmium sulfide in the materials described in the preceding examples has been verified in several ways. One of these is by X-ray analysis. X-ray analysis has shown that when amounts of magnesium sulfide, up to at least 20-25%, are used, there is a contraction of the crystal lattice.

Another good indication that solution of the magnesium sulfide has occurred is in the difference in behavior of the MgS before and after the heat treatment. Magnesium sulfide, being a typical alkali sulfide, is very sensitive to water. That is, in the presence of water, hydrolysis occurs and hydrogen sulfide is evolved. After the magnesium sulfide has been heated with the zinc sulfide or zinc-cadmium sulfide, the product is quite stable to water and gives no evidence of decomposition in its presence. Even when amounts of magnesium sulfide are used up to 30 mol per cent, no decomposition occurs in the presence of water.

A further interesting characteristic is that magnesium sulfide can be combined with either the hexagonal or the cubic crystalline forms of zinc sulfide. Magnesium sulfide, itself, is of cubic crystalline form. When combined with zinc sulfide, it assumes the crystal structure of the zinc sulfide.

Some of the effects of adding magnesium sulfide to zinc sulfide phosphor materials are illustrated in the accompanying drawings. Figure 1 is a graph containing two spectral distribution curves. Curve A is a curve of relative emission in the visible portion of the spectrum for a luminescent material comprising ZnS activated with .015% by weight of silver. Curve B is for a material comprising 90 mol per cent ZnS and 10 mol per cent MgS with .015% by weight of silver activator. The MgS was formed by starting with MgNH₄Cl₃ and heat treating the mixture of ZnS and the magnesium compound in an atmosphere of hydrogen sulfide. In both cases, the materials were heated to 1050° C., first in an atmosphere of hydrogen sulfide for 40 minutes, then in an atmosphere of sulfur dioxide for 40 minutes. 5% by weight of NaCl was added as a flux. As shown by curve A, the peak wavelength of emission for the ZnS phosphor without MgS was about 4600 Å. As shown by curve B, the peak wavelength of emission of the ZnS-MgS phosphor was about 4400 Å. Although the relative heights of the peaks on this graph do not indicate the relative intensities of luminous output, in general the ZnS-MgS phosphors have efficiencies at least equal to those of their counterparts having no MgS added, and in some cases, greater efficiency.

Curve A of Figure 2 is for a ZnS phosphor activated with .01% by weight of copper. The material was prepared by heating the mixture of sulfide and activator at 950° C. for 40 minutes in an atmosphere of nitrogen. 1% $MgCl_2$ was used as a flux. Curve B is for a copper activated material comprising 90 mol per cent ZnS and 10 mol per cent MgS. The material was prepared by heating at 950° C. for 45 minutes in an atmosphere of $H_2S$, then in a nitrogen atmosphere for 5 minutes additional. Curve A has its peak at about 5350 Å.; curve B has its peak at about 5250 Å.

The curves of Figure 3 illustrate the effects of adding bismuth or lead activators to a ZnS-MgS phosphor of the present invention and also bring out the difference between peak wavelength of emission obtained with this type of phosphor and that of an ordinary ZnS phosphor. Curve A is for the ZnS:Ag phosphor. Its peak wavelength of emission is about 4650 Å. Curve B is for a phosphor comprising 90 mol per cent ZnS and 10 mol per cent MgS with .1% by weight lead activator. The material was prepared by heating at 1050° C. for 40 minutes in an atmosphere of $H_2S$, then for 40 minutes at the same temperature in an atmosphere of $SO_2$ with 5% NaCl as a flux. The peak emission is at about 4450 Å. Curve C is for a phosphor similar to that of curve B but using .1% by weight of bismuth as activator. The conditions of preparation were the same as for that of the phosphor of curve B. Peak emission is at about 4500 Å.

The materials of the present invention may be used for the same purposes as zinc sulfide phosphors have previously been used. Principal uses are for viewing screens of television kinescope tubes and for luminescent paint pigments. Decay rates of the new phosphors are of the same type as those of ZnS phosphors. Activated with silver, the new phosphors have a somewhat shorter decay period; activated with copper they have a somewhat longer period of decay.

A wider range of activators can be used with the materials of the present invention than can be used with zinc sulfide or zinc-cadmium sulfide phosphors having no magnesium sulfide in solid solution. For example, there may be used not only the activators silver, copper, manganese, gold, and lead, previously used with the zinc sulfide or zinc-cadmium sulfide phosphors but also others such as bismuth, arsenic, and antimony. These activators may be used in the following percentages by weight:

Cu=0.0001 to about 0.02
Ag or Au=.0005 to about 0.02
Mn=.001 to about 1.0
Pb=.001 to about 1.0 and any of the group consisting of Bi, As, and Sb may be present within the range of about 0.001 to about 0.1% by weight with 0.01 by weight being preferred.

Not only may any of the activators of either of the above groups be used singly, but any pair may also be used. Preferred combinations of activators are: silver-copper, lead-copper, manganese-copper, and lead-manganese. Different members of any one pair need not be limited to either group but may be selected from both groups.

In general, improved phosphors according to the present invention can be prepared from any zinc-cadmium sulfide material by the addition of magnesium sulfide. These zinc-cadmium sulfides may comprise 99.5 mol per cent zinc sulfide—0.5 mol per cent cadmium sulfide to 30 mol per cent zinc sulfide—70 mol per cent cadmium sulfide. It is preferred, however, to use zinc-cadmium sulfides consisting of about 95 mol per cent ZnS and 5 mol per cent CdS to about 50 mol per cent ZnS and 50 mol per cent CdS.

I claim as my invention:

1. A phosphor comprising 99.5 to about 70 mol per cent zinc-cadmium sulfide consisting essentially of from 99.5 to 50 mol per cent zinc sulfide and 0.5 to 50 mol per cent cadmium sulfide, and from 0.5 to about 30 mol per cent magnesium sulfide in solid solution in the zinc-cadmium sulfide and including an activator selected from the class consisting of copper in an amount of 0.002 to 0.02 per cent by weight, silver in an amount of 0.0005 to 0.02 per cent by weight, gold in an amount of 0.0005 to 0.02 per cent by weight, manganese in an amount of 0.001 to 1.0 per cent by weight, lead in an amount of 0.001 to 1.0 per cent by weight, bismuth in an amount of 0.001 to 0.1 per cent by weight, arsenic in an amount of 0.001 to 0.1 per cent by weight, and antimony in an amount of 0.001 to 0.1 per cent by weight.

2. A phosphor according to claim 1 containing copper as activator.

3. A phosphor according to claim 1 containing bismuth as an activator.

4. A phosphor according to claim 1 containing antimony as an activator.

5. A phosphor comprising 99.5 to about 70 mol per cent of a material from the class consisting of zinc sulfide and zinc-cadmium sulfide containing 0.5 to about 30 mol per cent magnesium sulfide in solid solution and also including an activator selected from the class consisting of copper in an amount of 0.0002 to 0.02 per cent by weight, silver in an amount of 0.0005 to 0.02 per cent by weight, gold in an amount of 0.0005 to 0.02 per cent by weight, manganese in an amount of 0.001 to 1.0 per cent by weight, lead in an amount of 0.001 to 1.0 per cent by weight, bismuth in an amount of 0.001 to 0.1 per cent by weight, arsenic in an amount of 0.001 to 0.1 per cent by weight, and antimony in an amount of 0.001 to 0.1 per cent by weight.

6. A phosphor according to claim 5 in which said activator comprises not more than two members of the class consisting of silver, copper, gold, manganese, bismuth, arsenic, antimony, and lead.

7. A phosphor according to claim 6 in which said activator comprises silver and copper.

8. A phosphor according to claim 6 in which said activator comprises copper and manganese.

ARTHUR L. J. SMITH.

REFERENCES CITED

The following references are of record in the file of this patent:

UNITED STATES PATENTS

| Number | Name | Date |
| --- | --- | --- |
| 2,074,226 | Kunz et al. | Mar. 16, 1937 |
| 2,402,757 | Leverenz | June 25, 1946 |

FOREIGN PATENTS

| Number | Country | Date |
| --- | --- | --- |
| 299,797 | Great Britain | Nov. 1, 1928 |